No. 801,428. PATENTED OCT. 10, 1905.
F. V. WINTERS.
BRAKE.
APPLICATION FILED JULY 6, 1903. RENEWED JULY 27, 1904.
3 SHEETS—SHEET 2.
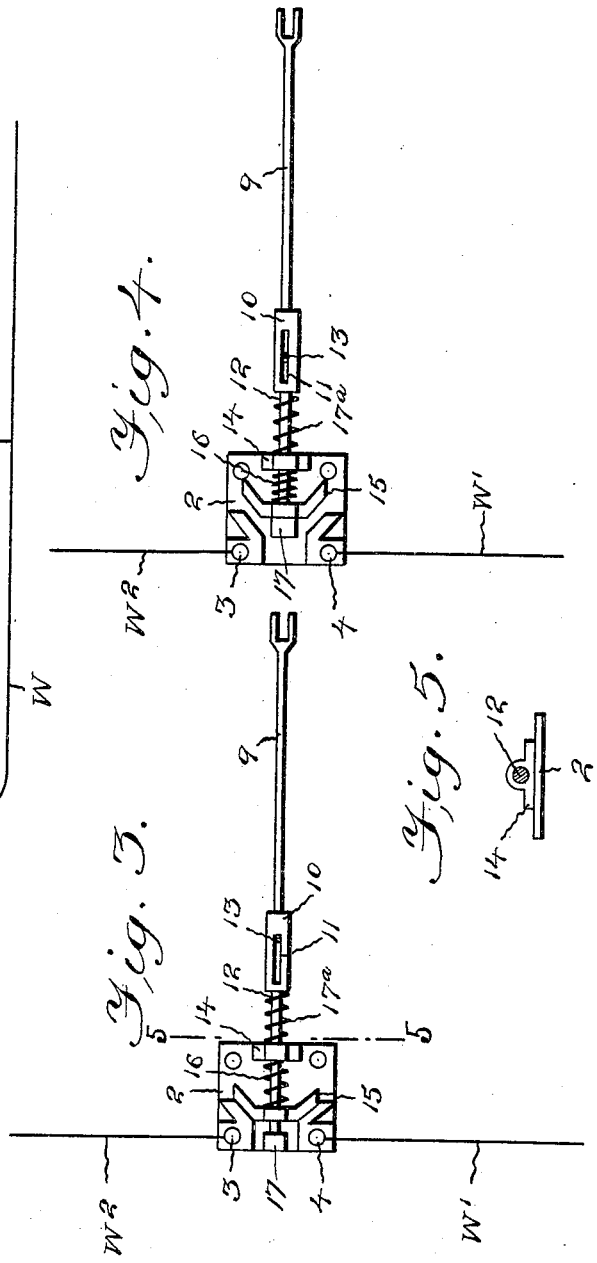
WITNESSES:
F. W. Riley
Geo. Hilton
INVENTOR
F. V. Winters.
BY A. G. Heylmun,
Attorney

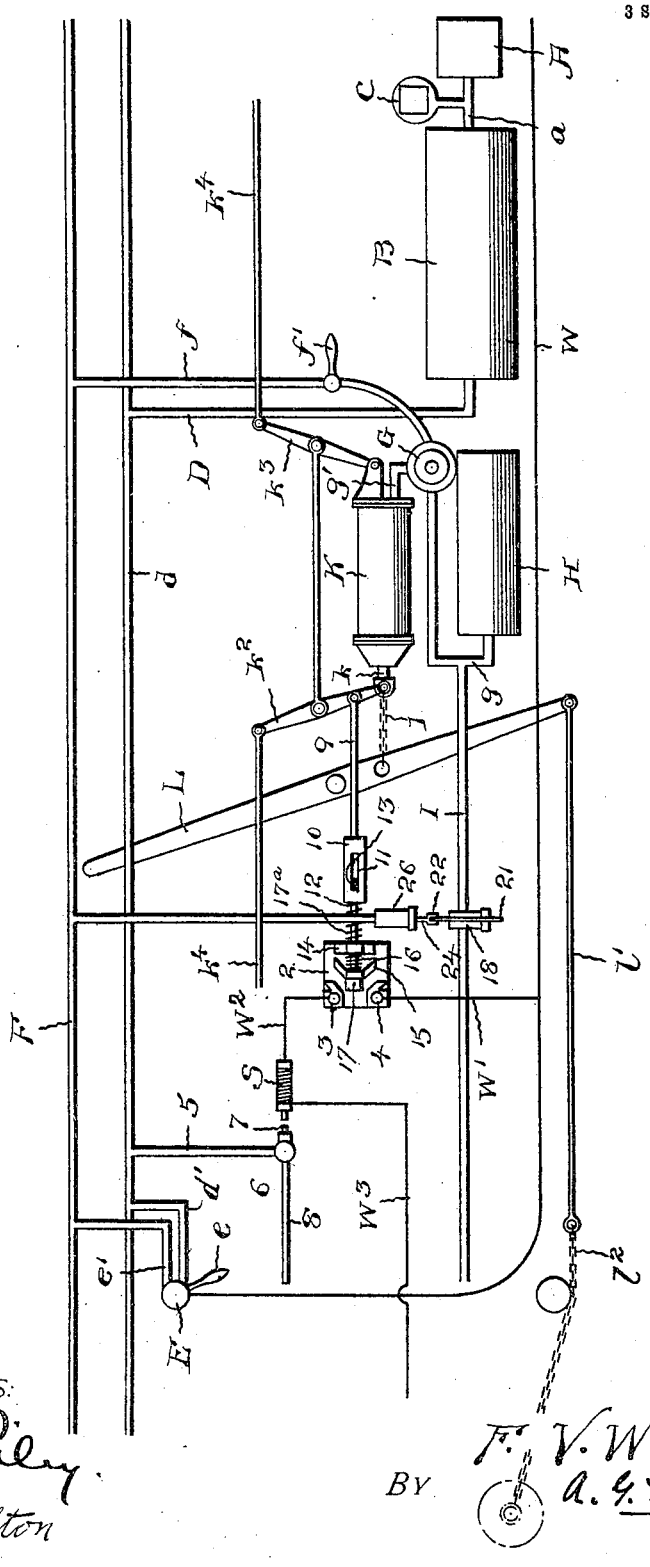

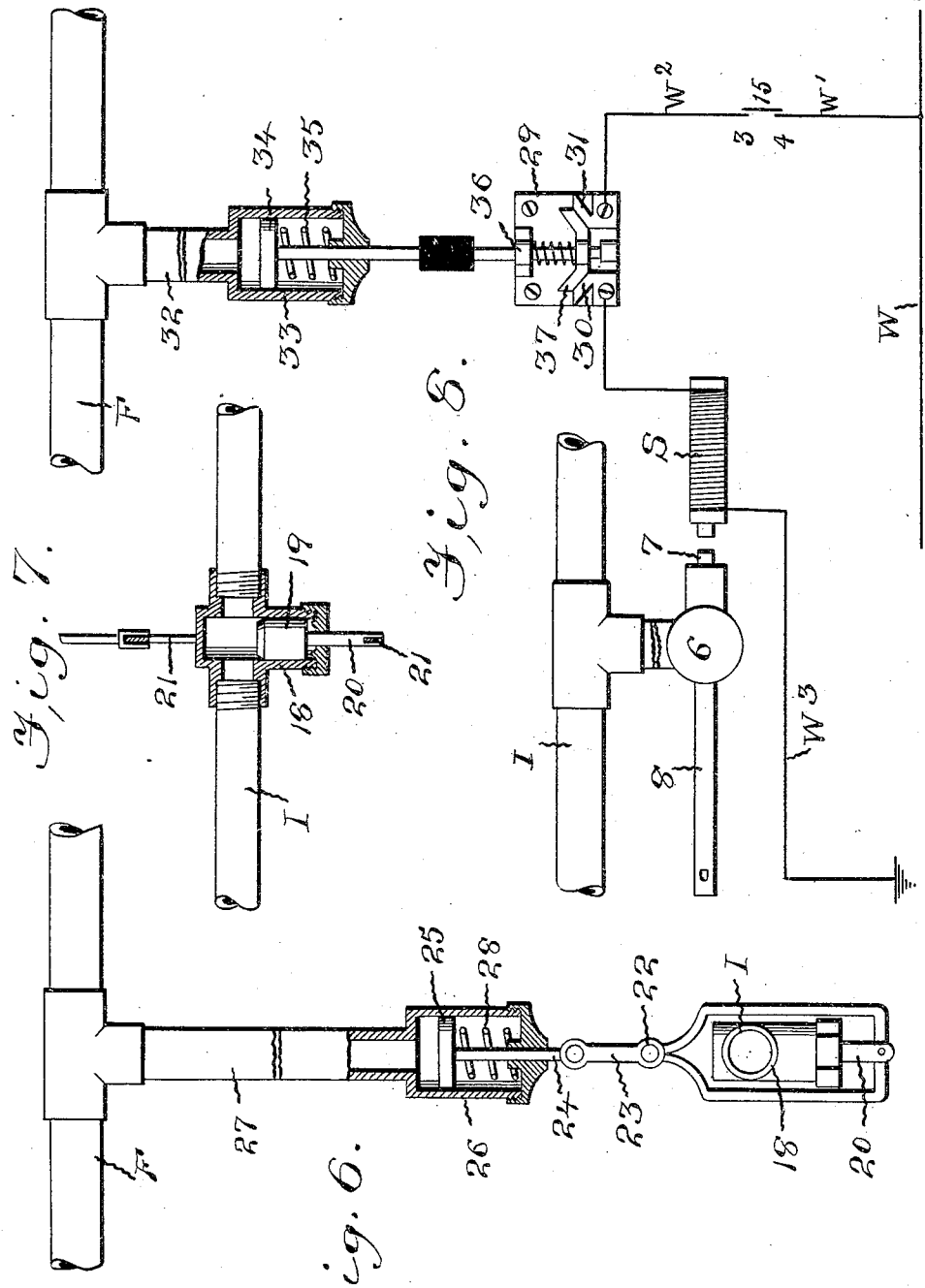

UNITED STATES PATENT OFFICE.

FREDERICK V. WINTERS, OF NEW YORK, N. Y., ASSIGNOR OF ONE-HALF TO THOMAS J. NORTON, OF NEW YORK, N. Y.

BRAKE.

No. 801,428.      Specification of Letters Patent.      Patented Oct. 10, 1905.

Application filed July 6, 1903. Renewed July 27, 1904. Serial No. 218,391.

*To all whom it may concern:*

Be it known that I, FREDERICK V. WINTERS, a citizen of the United States, residing in the city of New York, in the State of New York, have invented certain new and useful Improvements in Fluid-Pressure Car-Brakes, of which the following is a specification.

My invention relates to improvements in brakes, and especially to that class known as "car-brakes."

In the accompanying drawings I have illustrated a construction comprising a brake system in use on multiple-unit trains and on an electrically-operated car and showing the preferred form of my invention applied thereto.

The particular form of brake system which I have shown therein and which I will hereinafter generally describe is a fluid-pressure car-brake system. I do not wish to limit myself, however, either to any particular form or any particular class of brake or brake system or to any particular form or class of car or vehicle. My invention may be applied by proper modifications to any brake or brake system on any car or other vehicle on which it may be desired.

In the use of various brakes and brake systems—such, for example, as that illustrated in the accompanying drawings and hereinafter generally described—it has been found that after the brakes have been applied or set trouble is caused by one or more thereof remaining "set," or, in other words, failing to release after the engineer's valve has been placed in full-released position and the train-line recharged and the power has been applied to start the train. This results in what is known as "flat" wheels and very considerable consequent injury and expense. By the use of my invention whenever a brake remains set after the engineer's valve has been placed in full-release position either a signal or an alarm may be given or the brake may be automatically released or both results may be accomplished.

Referring to the accompanying drawings, in which similar reference characters designate corresponding parts, Figure 1 is a conventional and diagrammatic view of a fluid-pressure car-brake, showing one form of my present invention applied in one manner. Fig. 2 is a detail view wherein is shown a modified form and arrangement thereof. Fig. 3 is a detail plan view of parts comprised in a circuit for actuating one form of an alarm-controller when the brake is "on." Fig. 4 is a view similar to Fig. 3, showing the parts in a different position. Fig. 5 is a transverse section on the line 5 5 of Fig. 3. Figs. 6, 7, and 8 are detail views, partly in section, of devices for use in connection with the application of "the emergency," as will be more fully hereinafter explained.

I will now describe in a general way one form of a fluid-pressure car-brake system applied to "electrical multiple-unit trains," by which latter expression I mean a train comprising two or more electric unit cars, each provided with a complete braking system and operating devices therefor.

It will be understood that in the accompanying drawings I have shown a system and appliances for a single car and that the hereinafter-described train-line and main-reservoir line of all the cars in a train will be connected in any suitable way, such as by hose and coupling, to form a continuous train-line and a continuous main-reservoir line extending from the engineer's valve in the car which is being used as the control-car in and throughout the rest of the train.

Referring now to the drawings, A designates a pump or compressor. $a$ designates a pipe leading therefrom into the main reservoir or tank B, and C is a governor suitably connected to the pipe $a$ to regulate the pressure in the main reservoir. From the main reservoir leads a pipe D, which opens into the main-reservoir line $d$, which leads by a branch $d'$ to the engineer's valve $e$, situated in the engineer's cab E.

From the engineer's cab E leads a pipe $e'$, which opens into the train-line pipe F, from which branches a pipe $f$, leading into a triple valve G. In the pipe $f$ is arranged an angle-cock $f'$, the uses of which are well known. From the triple valve leads a pipe $g$, which opens into an auxiliary reservoir H. Connected with this pipe $g$ is a release-pipe I, the purpose of which will more fully be hereinafter explained. Leading from the triple valve is another pipe $g'$, opening into a brake-cylinder K, wherein is the usual piston $k$, to the projecting end of which is pivotally connected one end of the brake-lever $k^2$. To the other end of the brake-cylinder is pivotally connected one end of the other brake-lever $k^3$. The other or upper ends of the brake-levers $k^2 k^3$ are suitably connected to the brake-frames in any well-known manner. L designates the usual hand-brake lever having proper flexible connection, as by a chain $h$, to the outer end of the piston-rod $k$, and having its lower end connected to a rod $l'$ and chain $l^2$ to the hand-brake shaft. Similar connection is made to the other end of the car; but it is not deemed necessary to show this in the illustrations.

The usual operation of the above-mentioned devices is as follows: The governor C starts the pump or compressor A and air is forced into the main reservoir B and reaches the main-reservoir line $d$ through the connecting-pipe D with a determined pressure—say ninety pounds. The engineer's valve $e$ is then placed in full-release position, and the train-line F and auxiliary reservoir H are thereby charged from the main-reservoir line at somewhat less pressure—say seventy pounds—and the triple valve G will thus be forced approximately closed. Now the auxiliary being charged to seventy pounds and the train-line at the same pressure equilibrium is produced, and the governor C, which controls the pressure, is then automatically thrown out and the pump stops and the mechanism is in position for braking action. When such action is required, the engineer places the brake-handle in service position and the pressure in the train-line is reduced, say, ten pounds, the air released escaping to the atmosphere, while the pressure in the auxiliary reservoir remains at seventy pounds, so that this greater pressure will force the triple piston and slide-valve out the requisite distance to admit air into the brake-cylinder K, and the brake-cylinder piston is thus forced out, and through its connections the brake is applied. After the brake has served its purpose the engineer's valve $e$ is placed in the full-release position again, as when the train-line was charged, so that the excess pressure in the main reservoir and in the main-reservoir line (say ninety pounds) recharges the train-line (to, say, seventy pounds) and forces the triple piston back to a proper position to allow the recharging of the auxiliary and cut off communication to the brake-cylinder, when the air in the brake-cylinder will escape to the atmosphere through the usual release-port, and the brake should thus be released. It has been found, however, that at times the brake refuses to release, owing to any one of a number of causes—such as, for example, the triple-valve piston getting stuck or the triple-piston packing fitting loosely, allowing air to blow through, or the valve sometimes getting frozen.

I will now describe two arrangements for giving a signal or alarm as applied to the particular system shown in the accompanying drawings and above described and applied to a car which is electrically operated. Of course the nature of the alarm or signal may be varied, and the specific form of actuating the same will be changed to adapt it to various other forms of brakes and brake systems and various other styles of cars or vehicles and various other methods of operating vehicles.

Referring to the drawings, particularly Figs. 1, 3, and 4, 2 designates any suitable supporting-base of insulating material—such as stone, slate, &c.—to or on which are shown secured opposite contact-pieces 3 and 4, which are preferably made with inclined surfaces, substantially as shown in the drawings, so as to serve as guides to direct the coincident surfaces of the contact-piece carried by a rod connected to the brake-lever or to the piston-rod of the brake-cylinder, as will hereinafter be more fully described. Of course any suitable form of circuit maker and breaker may be used. Connected to the contact-piece 4 is a wire W', which may be suitably connected to any source of electrical supply in any suitable manner which will render the wire dead whenever current is shut off from the motors and charged so soon as the power is applied. For example, the line W' may be connected to a branch circuit W, leading from a point of convenient control, such as the engineer's cab E, to a main circuit at any suitable point of connection where that portion of the main circuit is energized whenever power is applied to the motor and dead whenever current is shut off from the motor, such as any point intermediate a motor and its motor-switch or contact-breaker. Any form of control may be used by the engineer which will make and break the circuit simultaneously, or substantially simultaneously, through or to the contact 4 and through the motor or motors. To the contact-piece 3 is connected a wire $W^2$, which leads to a suitably-arranged electromagnetic device, such as a solenoid S, which also has a suitable connection to the "ground," as by wire $W^3$. This electromagnetic device may be of any suitable form or construction, although I have shown a solenoid. For example, it might be a single magnet or even any suitable form of electric motor. The purpose of this device is when energized to actuate a control device for a signal or alarm, and obviously the form, arrangement, and operation of the electromagnetic device may be varied to suit the particular kind of alarm selected, as may also the form, arrangement, and operation of the "alarm-controller," by which I mean the control device for the signal or alarm. For example, any form of valve might be used for any alarm actuated by air, fluid, or steam, and any form of switch might be used for any alarm actuated by electric current.

As shown in the accompanying drawings, Fig. 1, the control device is a slide or spring-actuated valve 7, mounted in the valve-casing 6, controlling a pipe 8, to which will be secured a whistle or other suitable style of alarm. Connected to this valve 7 is a pipe 5, which is connected at its other end to the main-reservoir line $d$. The stem of the valve 7 (shown as disposed in alinement with the core of the solenoid S) will be subject to the force of the core when the solenoid is energized. In other words, whenever the solenoid is energized the core will be forced against the valve-stem and the valve opened, thereby allowing air from the main-reservoir line to rush through the pipe 5, through the valve 7, and into and through the pipe 8 to blow a whistle or actuate any other suitable alarm or signal connected therewith.

In the modification shown in Fig. 2 the core of the solenoid S is disposed in alinement with the stem of valve 7, similarly arranged in the valve-casing 6 and controlling the pipe 8, to which the alarm may be attached. In this construction the valve 7 is connected by means of a pipe $5^a$ to the release-pipe I, which release-pipe, as already pointed out, is connected to the pipe $g$, which is connected to the auxiliary reservoir H. As a result whenever the solenoid is energized in this modification the valve 7 will be opened and allow an escape of air from the auxiliary reservoir and through the pipe $5^a$, through the valve 6, into and through the pipe 8 to sound a whistle or other suitable alarm connected therewith. Of course any other form of electromagnetic device and any other suitable form of control may be used in this modification, as well as in the first form, already described, and more specifically illustrated in Fig. 1.

Assuming, as already stated, that the wire W' is energized whenever the current is applied to the motor, or, in other words, whenever power is turned on, then the solenoid or other electromagnetic device in either of these modifications will be energized whenever the contact-pieces 3 and 4 are connected and put in circuit or whenever the circuit is closed. I have shown the following means for connecting these contact-pieces whenever the brake in question is set: To the brake-lever $k^2$ is pivotally connected a rod 9, which, however, may be directly connected to the piston-rod. The other end of the rod 9 is shown as being rigidly fixed in one end of an insulating coupling piece or block 10, which is provided with an opening or slot 11, extending longitudinally of the block. To the other or outer end of the block 10 is slidably secured a bar 12, having its end projecting into the slot 11 and provided at its inner end with a pin 13, so that the end of the bar 12 with the pin will slide in the slot 11. The bar 12 loosely rides in a guide or keeper 14, secured on the insulating base-piece 2, and has slidably mounted thereon a contact-piece 15, formed with inclined wings which coincide with and set against the inclined surfaces of the contact-pieces 3 and 4, as shown in the drawings. On the rod or bar 12 between the keeper or guide 14 and contact 15 is a buffer-spring 16, bearing outwardly against the contact 15, which engagement causes the spring 16 to act as a resisting medium or cushion to hold the contact-piece seated for a time while the bar is moved toward the brake-cylinder and until a further movement of the bar brings the cap 17 on the end thereof into engagement with the contact-piece 15, when the contact will be disengaged by a further movement of the bar, as shown in the drawings, and the contact-piece will then be held out of engagement with the contact-pieces 3 and 4 until the brake-piston is again forced out and operates through the connections to reseat it and restore the connection.

It will be perceived that the slidably-mounted contact-piece 15 will be held in connection with the contacts 3 and 4 by the expanding-spring 16, whether the piston of the brake-cylinder moves a shorter or longer stroke, because the spring will give or yield and yet the contact will remain seated without producing undue strain on the stone base, which condition would be present if the rod were rigid in the contact-piece, and were it not for the action of the spring the car-brake slack might be so great as to give the piston an excess of travel, and that would destroy or displace the stone base. The spring insures the seating of the contact-piece and at the same time compensates for the variable distances which the piston may travel.

Of course any construction or arrangement of parts which will insure the contact-pieces 3 and 4 being connected whenever the brake in question is set may be used. Evidently, therefore, in the construction above described whenever a given brake is set the circuit from the wire W' through the electromagnetic device, such as the solenoid S, is complete. Consequently the moment power is applied and the wire W' is supplied with current the electromagnetic device or solenoid S will be energized and the valve 7 opened to allow the actuation of the signal or alarm. Similarly if the power is on and a brake becomes set for any cause an alarm will be given. Of course if a brake is set by hand and left set after power is applied the same result will follow. So soon as the alarm is given the brake can be released by hand or any other necessary steps taken to remedy the trouble. For example, the release-pipe I may extend to a platform or any other place convenient of access and there provided with a suitable valve which will enable one to release the brakes by hand by exhausting more or less air from the auxiliary and without in any way stopping or interfering with the movement of the train whenever it may be desirable—such, for example, as when an alarm has been given. If the brake is released, the connection between the contacts 3 and 4 will be broken and the circuit opened. Consequently when power is applied no alarm will be given.

Referring again to the construction and arrangement shown in Fig. 2, it is evident that the air escaping from the auxiliary through the release-pipe I, connecting-pipe 5ˣ, and the valve 6 and pipe 8, whether an alarm is applied to said pipe or not, will reduce the air-pressure in the auxiliary reservoir and will place the excess pressure on the other side of the triple piston and force that element to a position to release the brakes, cut off the supply to the brake-cylinder, and recharge the auxiliary. The bore in the valve 6 being considerably larger than the feed-groove in the triple valve causes a rapid discharge of air through the valve 6 and a consequent rapid reduction of the auxiliary pressure below the train-line pressure. As a result the brake-piston K, by reason of the brake-cylinder spring which is contained in the brake-cylinder, (not shown,) will force the piston in or inward when the air is released, unseating the contacts and breaking the solenoid-circuit. Thus the valve 7 will be allowed automatically to close, closing the release-pipe of the auxiliary and also shutting off the alarm whenever one is provided on the pipe 8.

In case of accidents or for other causes when the emergency is pulled or used the pressure is reduced in the train-line and every brake is set at its full capacity, and if for any reason should the power be not shut off by the engineer the automatically-acting means of my device above mentioned would be of little or no value, because all the contacts 15 would be closed and the solenoids would open all the air-valves 6, and thus release the brakes and affect their efficiency. As an additional precaution to meet and remedy this exigency or emergency I provide the following-described means or device, (see Figs. 6 and 7 of the drawings for details of this construction:) In the release-pipe I is inserted a valve-casing 18, wherein is slidably arranged a valve 19, having its stem 20 projecting through the head of the case and the outer end thereof secured to the end bar of a stirrup 21, the inner ends of which are united and formed with an eye 22, which is connected to one end of a bar 23, the other end being connected to the end of a rod 24 of a piston 25, working in a cylinder 26, fixed to the end of a pipe 27, opening into the train-line F, substantially as indicated, the tension being at normal or seventy pounds. On the rod 24 of the piston 25 within the cylinder 26 is arranged a spring 28, expansive in force and of such strength or force as to stand at a determined position under the normal pressure in the train-line F and adapted to automatically force the piston upward or inward should the pressure be reduced in the train-line below the normal of seventy pounds. It will be stated that an ordinary stop is made with about a ten-pound reduction in the train-line pressure, and when the exigency arises and the emergency stop is to be made the reduction in pressure amounts to twenty pounds or more, in which case the spring 28 is made to exert its force on the piston and force it in the direction of the pipe F, and by this movement because of the connections to the slide-valve 19 that valve will be moved to set across and close the bore of the release-pipe I and shut off the passage of air through the pipe, which would otherwise escape should the engineer continue to use power or did not shut off the power at once, and I thereby protect and preserve the efficiency of the brake, and then when the train-line is recharged all parts will resume their several correct positions. It will make no difference in the operative results in the usefulness of this release device whether the emergency is used frequently or infrequently, because in each instance all the parts will resume their correct positions and relations when the train-line is recharged, which must be done before the brakes can be released. The release is also further protected as follows: Referring to Fig. 8 of the drawings, illustrative of this protecting means, 29 designates a stone or slate supporting base on which are mounted and secured contact-pieces 30 31, which are connected up in the electric circuit coupled to the main-line cable or circuit-wire $w$ and to the solenoid $s$. In the train-line is let a pipe 32, having a cylinder 33 on its outer end, wherein is disposed a piston 34, subject to a certain reverse action by the expansive force of a spring 35 on the piston-rod 34 within the cylinder. The piston-rod is extended out of the cylinder and through a guide piece or keeper 36 and carries on its end a contact-piece 37, which removably bridges the contacts 30 31, and thus closes the circuit through the solenoid. The action or operation of this protecting device is as follows: When the pressure in the train-line is at normal, say, seventy pounds, the contact-piece 37 is always closed. In the case of accident or when the emergency is being used or has been used the reduction of pressure in the train-line will permit the spring 35 to actuate the piston 34 and separate the contact-pieces 37 30 31 and open the circuit of the solenoid S, so that the closing of the brake-controlled contacts 3 15 4 and of the power-circuit cannot close the solenoid-circuit and cannot cause the valve 7 to open the release. When, however, the train-line is again charged, the contact-piece 37 will be reseated by the train-line pressure exerted against the piston 34, thus restoring the solenoid-circuit to the control of the brake and train controller, so that when the controller-circuit is closed should any of the brakes be not released the solenoid will actuate the valve 7, with the results heretofore specified.

It may be stated that the device illustrated in Fig. 8 may be regulated or adjusted to work at a determined pressure in the train-line, so as to prevent a release at any time should the slide valve or plug (shown in Fig. 6) from any cause leak air when the contacts are closed, when an unexpected emergency application has been made and the engineer continues to use power.

By personal experience I find that an engineer will at once notice the application of the emergency if made by any conductor's valve on a train-line and shut off power. Should this not be noticed, the importance of the device shown in Fig. 8 will be readily understood, and that a break in the solenoid-circuit will prevent the actuation of the air-valve 7 and the full efficiency of the breaking force will be securely protected, and when the train-line is again recharged to seventy pounds the device shown in Fig. 8 will reseat and the solenoid-circuit will again be established to release any brake that may have remained unreleased on any car, when the engineer again uses the power, as before described.

It may be stated that the several elements of the invention may be incased in suitable inclosures to prevent deleterious effect of the elements and other extraneous influences.

What I claim as my invention, and desire to secure by Letters Patent, is—

1. The combination with a car provided with brakes, of motive-power-controlling means for the car, an alarm, and means for automatically actuating the alarm whenever a brake and the motive-power-controlling means for the car reach a predetermined position.

2. The combination with a car provided with brakes, means for applying the same and means for releasing the same, of an alarm, and means for automatically actuating the alarm whenever a brake remains "set" upon application of the releasing means and applying of power to the car.

3. The combination with a car provided with brakes, of an alarm, an alarm-controller, and means for automatically operating the alarm-controller to sound the alarm whenever a brake remains "set" after applying power to the car.

4. The combination with a car provided with brakes, of an alarm, and an electrically-actuated alarm-controller, arranged in a circuit controlled by the position of the brake and by the motor-circuit of the car.

5. In a brake apparatus, the combination of an alarm an electric circuit for operating the alarm, means for controlling the circuit operating in conjunction with the brake and means for controlling the circuit operated by the motorman, whereby when both of said means are simultaneously in a predetermined position the circuit will be energized to operate the alarm.

6. In a brake apparatus, the combination of an alarm, means for operating the alarm, a controller for said means operating in conjunction with the brake, and a controller for said means operable by the motorman, whereby when both controllers are simultaneously in a predetermined position the alarm will be operated.

7. The combination of a brake, an alarm adapted and arranged to indicate the position of the brake to a person on the same train on which the brake is located, and an electric circuit for operating the alarm controllable by the position of the brake.

8. The combination with a car provided with brakes, of an alarm, an alarm-controller, an electric circuit, an electromagnetic device arranged in said circuit to actuate said controller, and a contact controlled by the position of the brake to make and break said circuit.

9. In an air-brake system, the combination with a brake of a controller, an electric circuit, an electromagnetic device in said circuit to actuate said controller, and a contact controlled by the position of the brake to make and break such circuit.

10. In a fluid-pressure car-brake, an alarm connected to one of the air-pipes, an alarm-controller, an electric circuit, an electromagnetic device arranged in said circuit to actuate said controller, a rod controlled by the position of the brake, and a contact on the rod to make and break the circuit.

11. In a fluid-pressure car-brake, an alarm-controller in the pipe system, an electric circuit, an electromagnetic device in the circuit to actuate the controller, a make-and-break device in the circuit and operative connections from the make-and-break circuit to the brake mechanism to operate the said device.

12. In a fluid-pressure car-brake, the combination of an insulating-support, contact-pieces secured to the said support with a space between them, wires connected to said contact-pieces and constituting limbs of an electric circuit, an electromagnetic device interposed in the circuit, an air-valve to be opened by the electromagnetic device, a contact-piece to yieldingly engage the separated contact-pieces, and the brake-piston connected to the yielding contact-piece.

13. In a fluid-pressure car-brake, the combination with the pipe system, of a valve mounted therein, an electric circuit, an electromagnetic device in the circuit disposed to open the valve, fixed contact-pieces in the circuit standing separated from each other, a rod connected to the brake-piston, an insulating-block carried by the rod and formed with a longitudinal slot, a rod slidingly and yieldingly disposed through the outer end of the insulating-block and projecting into the slot thereof, and a contact-piece on the latter-mentioned rod to close the space between the separated contact-pieces.

14. In a fluid-pressure car-brake, the combination with the train-line pipe and the release-pipe, of a valve in the release-pipe, a pipe opening from the train-line pipe, a cylinder on the end of the pipe, a piston in the cylinder, a stirrup connected to the valve-stem, and a spring to push the piston inward and close the valve when the pressure in the train-line is reduced.

15. In a fluid-pressure car-brake, the combination with the brake-piston, of a rod operated thereby, a contact-piece on the rod, an electric circuit having separated contact-pieces engaged by the contact-piece on the said rod, an electromagnetic device in the circuit, a valve opened by the electromagnetic device, a pipe opening from the train-line pipe, a valve in the release-pipe, and a spring-actuated device to close the valve in the release-pipe when the pressure in the train-pipe is reduced.

16. In a fluid-pressure car-brake, the combination with the pipe system, the brake-piston, an electromagnetic device, an electric circuit in which the electromagnetic device is interposed, of a contact-piece actuated by the brake-piston to make and break the circuit, and an automatically-acting valve in the pipe system to reduce the pressure in the pipe and permit the brake-piston to return to normal position.

17. In a fluid-pressure car-brake, the combination with the train-line, the brake-piston, an electromagnetic device, and an electric circuit in which the electromagnetic device is interposed, of a contact actuated by the brake-piston to make and break the circuit, a valve in the release-pipe, air-actuated means connected to the train-line to actuate the said valve when the pressure is reduced in the train-line, a spring-actuated contact to open and close the circuit, and means connected to the train-line to operate the contact-piece.

18. In a car-brake system, the combination with a car-brake of a circuit controllable by the motorman, and a circuit-breaker controlled by the positive position of the brake.

19. In a brake system, the combination with a brake, of a circuit, a circuit-breaker controlled by the position of the brake, and connecting means intermediate the brake and circuit-breaker comprising a compensating device.

20. In a car-brake system, the combination with a car-brake of a cylinder for actuating the same, a circuit controllable by the motorman and a contact-breaker actuated by said cylinder, and controlled by the position of the brake.

21. In a brake system, the combination with a brake of a cylinder for actuating the same, a circuit, a contact-breaker actuated by said cylinder, and compensating means intermediate said cylinder and contact-breaker.

22. The combination with a car provided with a brake system comprising an auxiliary reservoir, of a release-pipe connected to said auxiliary reservoir, a controller arranged in said release-pipe, and means for automatically operating said controller to open said pipe whenever a brake remains "set" after applying power to the car.

23. The combination with a car provided with a brake system comprising an auxiliary reservoir, of a release-pipe connected to said auxiliary reservoir, a controller arranged in said release-pipe, means for automatically operating said controller to open said pipe whenever a brake remains set after applying power to the car, and an alarm actuated by said release-pipe whenever opened.

24. In a fluid-pressure car-brake system comprising a brake actuated and controlled by relative pressures in opposing parts of the pipe system, the combination of a controller arranged in the pipe system and means controlled by the position of the brake and the motor-circuit to actuate said controller to affect the pressure in one of said opposing parts to release the brake.

25. The combination with a car provided with brakes, of means adapted automatically to release a brake whenever it remains set after power is applied to the car.

26. The combination with a car provided with brakes and a hand-controller for applying and releasing the same, of means adapted automatically to release a brake whenever it remains set upon the hand-controller being in release position and power being applied to the car.

In witness whereof I have hereunto set my hand in the presence of two witnesses.

FREDERICK V. WINTERS.

Witnesses:
 CHAS. E. RIORDON,
 C. G. HEYLNUN.